US008462582B2

United States Patent
Mellier et al.

(10) Patent No.: US 8,462,582 B2
(45) Date of Patent: Jun. 11, 2013

(54) METHOD FOR ASSISTANCE IN THE LOCALIZATION OF TOWED STREAMERS COMPRISING A STEP FOR DEFINING AND A STEP FOR GENERATING DISTINCT ACOUSTIC CYCLES

(75) Inventors: Gaëtan Mellier, Nantes (FR); Gilles Poete, Saffre (FR)

(73) Assignee: Sercel, Carquefou (FR)

( * ) Notice: Subject to any disclaimer, the term of this patent is extended or adjusted under 35 U.S.C. 154(b) by 363 days.

(21) Appl. No.: 12/826,813

(22) Filed: Jun. 30, 2010

(65) Prior Publication Data

US 2010/0329075 A1    Dec. 30, 2010

(30) Foreign Application Priority Data

Jun. 30, 2009  (FR) ...................... 09 03174

(51) Int. Cl.
   *G01V 1/38*   (2006.01)
(52) U.S. Cl.
   USPC ........................................................... 367/19
(58) Field of Classification Search
   USPC ........................................................... 367/19
   See application file for complete search history.

(56) References Cited

U.S. PATENT DOCUMENTS

| | | | |
|---|---|---|---|
| 4,912,682 A * | 3/1990 | Norton et al. ................. | 367/19 |
| 4,992,990 A * | 2/1991 | Langeland et al. ............ | 367/19 |
| 5,031,159 A * | 7/1991 | Rouquette .................... | 367/125 |
| 5,668,775 A | 9/1997 | Hatteland | |
| 7,267,070 B2 | 9/2007 | Le Page et al. | |
| 7,701,803 B2 * | 4/2010 | Welker ......................... | 367/17 |
| 2008/0304358 A1 | 12/2008 | Mellier et al. | |
| 2009/0141587 A1 * | 6/2009 | Welker et al. ................. | 367/16 |

FOREIGN PATENT DOCUMENTS

| | | |
|---|---|---|
| WO | WO-03/100451 | 12/2003 |
| WO | WO 2005096018 A1 * | 10/2005 |

OTHER PUBLICATIONS

Rapport De Recherche Préliminaire (French Search Report), dated Apr. 14, 2010, 2 pages.

* cited by examiner

*Primary Examiner* — Ian Lobo
(74) *Attorney, Agent, or Firm* — Pauly, Devries Smith & Deffner, L.L.C.

(57) ABSTRACT

A method for assistance in the localization of streamers towed by a vessel including at least one onboard acoustic controller, each streamer having: geophysical data sensors; acoustic means for measuring distance from at least one adjacent linear antenna; and means for the absolute localization of said antennas. The method includes at least one phase for the generating an acoustic cycle determining sequences and at least one phase for defining at least two distinct acoustic cycles representing a theoretical geometry capable of representing the shape of said streamers; at least one step for determining the real geometry of said streamers; at least one step for detecting a change in real geometry followed by a step for generating a new acoustic cycle, selected from among those defined during said phase for defining and adapted to said change in real geometry.

10 Claims, 1 Drawing Sheet

METHOD FOR ASSISTANCE IN THE LOCALIZATION OF TOWED STREAMERS COMPRISING A STEP FOR DEFINING AND A STEP FOR GENERATING DISTINCT ACOUSTIC CYCLES

CROSS-REFERENCE TO RELATED APPLICATIONS

This application claims the benefit of French Patent Application No. FR 09/03174 filed on Jun. 30, 2009, which application is hereby incorporated by reference in its entirety.

BACKGROUND OF THE INVENTION

1. Field of the Invention

The field of the invention is that of seismic data acquisition. More specifically, the invention pertains to equipment for seafloor analysis.

The invention relates in particular to the oil prospecting industry using seismic methods but can be applied in other fields implementing seismic data acquisition networks in marine environments.

2. Background of the Invention

In the field of the invention, operations for on-site geological data acquisition conventionally use sensor arrays (known as "hydrophones" in the case of data acquisition in marine environments). Seismic data acquisition in a marine environment is conventionally done by means of a series of seismic streamers or linear acoustic antennas towed by a vessel and carrying hydrophones in particular.

It is now the common practice to conduct campaigns of marine seismic prospecting known as 3D prospecting where the network of towed streamers has a determined length and width and is towed at a controlled depth. Thus, the set of streamers is typically towed at a depth ranging from 5 m to 15 m. Streamers are formed by an assembly of sections generally about 150 m long, and each antenna may be several kilometers (6 km to 7 km, or even 10 km) long. Conventionally, the number of streamers deployed can go up to twelve (and it is probable that the number of streamers used will continue to increase in the future). Each streamer is equipped with seismic sensors and analog/digital conversion electronic circuitry associated with the sensors.

The vessel that tows the streamers also tow one or more seismic sources constituted by a network of air-guns or water-guns or again, acoustic vibrators. The pressure wave generated by the seismic source crosses the water column and insonifies the upper layers of the sea floor. One part of the signal is refracted by interfaces and the inhomogeneity of the ocean crust. The resulting acoustic signals are then detected by the seismic sensors distributed throughout the length of the streamers. These acoustic signals are conditioned, digitized and retransmitted by the telemetry of the streamers to an operator's station situated on the seismic vessel where the raw data is then processed.

To have an accurate image of the cartography of the seafloor of the zone explored, it is important to precisely locate the seismic sensors distributed along the streamers as well as the seismic source. Different techniques have been proposed in the prior art for the absolute localizing of the positions of the seismic sensors distributed along the streamers.

The localization of the marine streamers and of the seismic source initially used to be based on the use of GPS receivers and magnetic compasses. The GPS receivers were situated at a few particular points of the network, namely on the towing vessel, the support buoys of the seismic source and the head and tail buoys each connected to the streamers. The magnetic compasses distributed in greater numbers along the streamers were used to determine the deformations of the streamers between particular points.

More recently, better performing techniques for localization streamers have been proposed. These techniques still use GPS localization to get the absolute geographical referential system but with it they associate the use of underwater acoustics to determine the distances between the acoustic modules mounted along the streamers.

These acoustic antennas dedicated to the functions of localization streamers are mounted in line or clamped to the streamers. They may be transmitters and/or receivers used to determine the distances between neighboring modules situated on the adjacent streamers.

Hence, in order to obtain the precise localization of all the streamers, reference points are available. These are given firstly by the GPS receivers and secondly by a meshing of inter-module distances. These acoustic measurements are generally made regularly in a predefined acoustic sending and receiving sequence characterizing a predefined acoustic cycle. This acoustic cycle is defined at the start of sending and can be updated during changes in seismic prospecting lines. However, an acoustic cycle is not modified in the course of a line. Furthermore, the definition of the acoustic cycle is based on the nominal theoretical geometry (i.e. in the straight-line acquisition phase) of the device.

The acoustic cycle is optimized in order to reach a compromise between:

its duration: this duration must be as small as possible to increase the temporal precision of the measurements and consequently obtain a greater sampling frequency. It can be noted furthermore that the duration of the cycle is commonly sized to be smaller than the duration of a seismic acquisition, the latter duration depending on the topology of the marine subsurface which the seismic study must analyze as well as the productivity constraints of the seismic study;

the quality of the measurements: since the acoustic signals share the same propagation medium, the definition of the acoustic cycle must take account of the geometry of the acoustic network in order to avert risks of signal collision.

As in radiofrequency transmission, there are various methods for sharing the transmission band:

frequency sharing;

sharing by means of transmission codes;

sharing in space (an acoustic wave continues to propagate after it has reached the target receiver);

sharing in time.

That said, it can be noted in practice that a limitation of the cycle time always tends to cause deterioration in the quality of the acoustic measuring.

Along with the problem of the relative localization of the streamers with respect to one another, there is also the problem of controlling the streamers in depth.

Indeed, the depth of the streamers has a direct impact on the characteristics of the seismic signals received by the sensors. The depth is conventionally controlled by an appropriate adjustment of the floatability of the elements forming the streamer. This is done through the use of navigation control devices (commonly called aircraft or "birds") as described by the patent document number FR-2 870 509. These devices are either attached to the streamers or inserted between two sections of the streamers.

Recently, seismic data acquisition techniques have developed into what are called 4D techniques: according to these techniques, the positioning of the streamer network is controlled in taking all three spatial dimensions (length, width, depth) and one temporal dimension into consideration. The time dimension is aimed at controlling the trajectory of the streamers in a zone considered, so as to reproduce trajectories already made on the same zone in a prior seismic data acquisition phase. These 4D techniques have propelled the development of new streamer control systems aimed at achieving both control of depth and control of the lateral position of the streamer. Lateral control necessitates a link with the acoustic localization system mentioned here above to provide the control device with information elements on relative distances between the antennas. These information elements are necessary for the control of the network. Here again, these new systems require increased precision in the localization measurements, including precision in acoustic localization techniques.

It must furthermore be noted that acoustic localization measurements are generally used only during seismic data acquisition phases.

Now since the configuration of an acoustic measuring cycle is static, it is generally not suited to phases in which the antennas are turning or are being deployed or folded. Indeed, since the time slots for sending and receiving acoustic signals are generally optimized for the nominal use case, changes in the geometry of the device will lead to time lags for acoustic receiving which then will no longer correspond to the time slots defined for the acoustic receiver elements.

When the phases no longer correspond to the nominal use case, the cables can then only be localized through the GPS localization of a tail buoy and by the use of compasses distributed along the cable. However, these elements by themselves cannot give a precise localization of the cable. However, these phases are generally difficult to implement and the possibility of adding a precise acoustic localization should appreciably improve the quality of localization of the cables and therefore the security of the device in water.

SUMMARY OF THE INVENTION

The invention is aimed especially at mitigating these drawbacks of the prior art. More specifically, it is an object of the invention to propose a method of assistance in the localization of streamers towed by a vessel used to obtain a continuous and optimum acoustic type of localization whatever the configuration and shape of the acoustic linear antennas. It is also an object of the invention to provide a method of this kind for obtaining acoustic localization measurements of satisfactory quality in an optimal cycle time.

These goals, as well as others that shall appear here below are achieved through the invention, an object of which is a method for assistance in the localization of streamers towed by a vessel including at least one onboard acoustic controller, each of said streamers having:
 geophysical data sensors;
 acoustic means for measuring distance from at least one adjacent linear antenna;
 means for the absolute localization of said antennas,
the method comprising at least one phase for the generating, by said acoustic controller, of an acoustic cycle determining sequences of acoustic sending and receiving between said distance-measuring acoustic means,
characterized in that the method comprises:
 at least one phase for defining at least two distinct acoustic cycles each representing a theoretical geometry capable of representing the shape of said streamers;
 at least one step for determining the real geometry of said streamers;
 at least one step for detecting a change in real geometry followed by a step for generating a new acoustic cycle, selected from among those defined during said defining phase and adapted to said change in real geometry.

Thus, the method of the invention provides the capacity to obtain a localization of the streamers through the use of acoustic means distributed along the antennas, this being done continuously and optimally, whatever the configuration of the streamers (partially or totally deployed), and whatever the shape of the streamers (straight line, turning, partly turning and partly in a straight line, etc).

The method of the invention therefore averts the need to distinguish between the straight lines in which the streamers are in a state of acquiring seismic data and the turns during which the cables are passive.

The result of this is that the continuous acoustic localization obtained through the method of the invention makes it possible to envisage the acquisition of seismic data whatever the shape of the streamers.

It may be recalled that, as mentioned here above, conventional methods of assistance in the localization of streamers define the acoustic cycle on the basis of theoretical geometrical data pertaining to the device in water: the rigging of this device is optimized to provide for regular calibration in order to obtain a predefined distance between the streamers. This is done during the straight-line phases (corresponding to the seismic acquisition phases). Furthermore, acoustic localization elements are laid out at known distances along the cable. These available information elements are used to define the acoustic cycle.

Current technologies provide for a fast reconfiguration of the acoustic elements in water and therefore enable a new acoustic cycle to be taken into account almost dynamically.

The principle of the invention therefore relies on this new possibility of dynamic reconfiguration so it is no longer a theoretical geometry but a real geometry that is used to define the acoustic cycle.

According to an advantageous approach, said defining phase includes the parametrizing of acoustic receiving time slots for said acoustic receiving sequences, said step for generating a new acoustic cycle modifying at least the duration of said time slots.

Thus, acoustic measurements of the highest quality possible are obtained in an optimum cycle time.

Furthermore, since the parametrized receiving slot is adapted to the signal, the risk of a false detection of a stray signal causing untimely "activation" of the receiver is reduced. The quality of the acoustic measurement is thereby improved.

In other words, the changes in real geometry of the device in water do not entail losses in acoustic measurements because of ill-adapted receiving time slots.

According to a first advantageous embodiment of the method of the invention, said step for determining the real geometry of said streamers is performed by taking account of acoustic measurements given to said acoustic controller by said distance-measuring acoustic means.

According to a second advantageous embodiment of the method of the invention, said step for determining the real geometry of said streamers is performed by taking account of the measurements given to said acoustic controller by said means for the absolute localization of said antennas.

In this case, said step for determining the real geometry of said streamers is preferably performed by means of localization data given by satellite.

According to an advantageous approach, said phase for defining said acoustic cycles comprises at least one phase for configuring cells each defined by a central position corresponding to a central distance-measuring means and by at least one peripheral position corresponding to another distance-measuring means proximate to said central distance-measuring means.

In this case, said phase for defining said acoustic cycles comprises a step for determining reference distances between said central positions and said peripheral positions, said phase for defining said acoustic cycles preferably comprising at least one phase for controlling said central and peripheral positions relative to said reference distances by means of an operation for putting at least some of said distance-measuring means into communication with one another.

According to the requirements of configuration of the device in water, the method advantageously comprises at least one phase for repositioning at least one of said linear antennas through the use of navigation control means distributed on the length of said linear antennas to act at least laterally on the position of said linear antennas.

According to an advantageous variant, the method comprises at least one step for memorizing the positions of said streamers and/or positioning said streamers as a function of the memorized positions of said streamers.

Thus, the method of the invention can be executed in the context of a prospecting campaign known as a 4D campaign.

BRIEF DESCRIPTION OF THE DRAWINGS

Other characteristics and advantages of the invention shall appear more clearly from the following description of a preferred embodiment of the invention given by way of an illustratory and non-restrictive example and from the appended drawings, of which.

DETAILED DESCRIPTION

Figure 1:
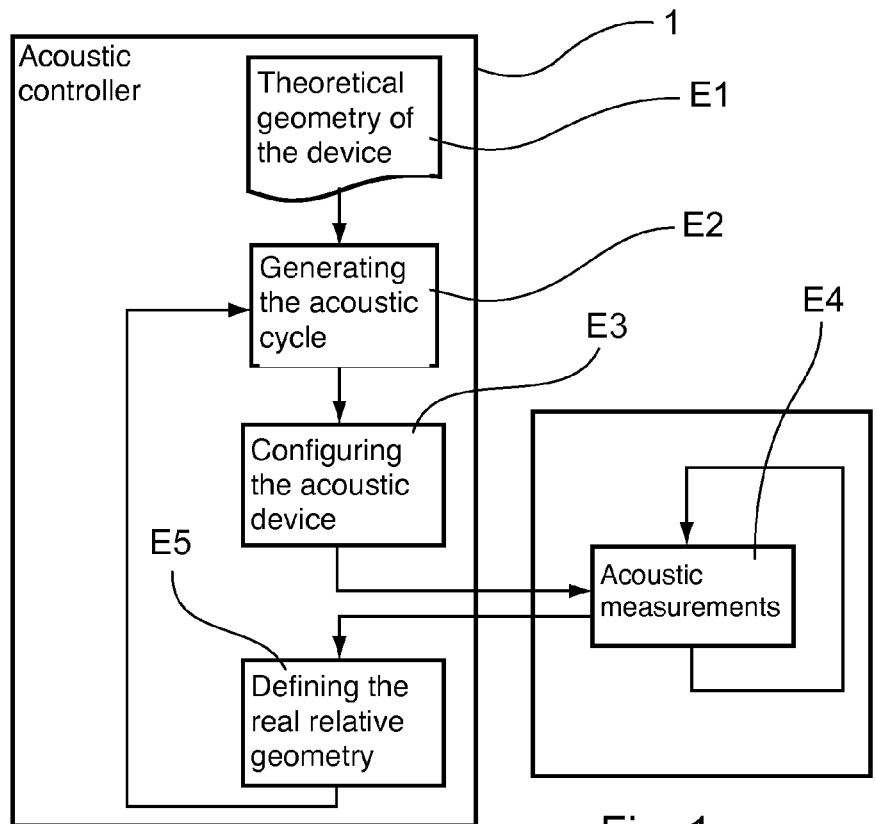
FIG. 1 is a schematic representation of the steps of a method according to a first embodiment of the invention.

In the description here below, the term "streamer" designates a towed streamer.

The method of the invention can be applied especially to the positioning of networks of streamers each comprising, in an evenly distributed way, distance-measuring means and navigation control means, the navigation control means being for example "birds" such as those described by the patent document published under number FR-2 870 509.

The distance-measuring means use an acoustic measuring system. This acoustic measuring is a two-way measuring operation. According to one advantageous embodiment, the measuring means are acoustic transducers which communicate with one another in such a way that a transducer of one streamer receives signals coming from one or more transducers of the adjacent streamer or even from both adjacent streamers.

To this end, each transducer comprises means for sending and means for receiving an acoustic signal.

The measurement of distance between the apparatuses is done by any acoustic measuring means known to those skilled in the art.

Such a system therefore has means of relative localization through which the positions of the sensors relative to one another are measured from one sensor to the next in a synchronized way, and this is done on the entire network of streamers.

More specifically, the method of the invention can be put into service in a system in which the measuring means are acoustic transducers that communicate with one another in such a way that the transducers of a streamer n−1 and the transducers of a streamer n+1 each send a signal at different instants to a transducer of a streamer n.

In this case the method comprises a step (assisted by software means) for configuring a plurality of cells each defined by:

a central position corresponding to the position of a transducer of a streamer n;

peripheral positions corresponding to other transducers in the neighborhood of the transducer: advantageously, each cell is defined by two or three or even four transducers of each streamer adjacent to the transducer Tn,m, namely the transducers of the central position.

The cell-configuring step can also be a step for defining (modifying) the number of peripheral transducers taken into account in the defining of a cell.

It can furthermore be noted that each streamer preferably also carries feedback control means distributed along the streamer and placed in the vicinity of a "bird" in such a way that the feedback control means of one streamer communicate locally with the birds of the same streamer, this being done after the data transmitted by the network of neighboring transducers has been processed.

In this system, the transducers communicate with one another so as to determine their respective positions, and then send out data on their position by means of feedback control means which in turn send an instruction to the corresponding bird.

At the same time, the network of streamers comprises means for the absolute localization of the streamers, more specifically comprising one or more compasses and means for global positioning by satellite (GPS).

Naturally, each streamer also carries a plurality of geophysical data sensors.

Referring to FIG. 1, the method of the invention implements an acoustic controller 1 on board the vessel towing the streamers. This acoustic controller in particular carries out a phase for generating acoustic cycles determining acoustic sequences of sending and receiving between the distance-measuring acoustic means.

According to the principle of the invention illustrated in FIG. 1, the acoustic controller performs the first step E1 designated as the step of the "theoretical geometry of the device". This step defines a series of distinct acoustic cycles each representing a theoretical geometry likely to represent the shape of the towed streamers.

The acoustic controller generates an acoustic cycle (step E2: "generation of the acoustic cycle"), enabling the network of streamers to be configured (step E3: "configuration of the acoustic device").

The acoustic measurements of distances between streamers are given to the onboard controller by means of the acoustic transducers distributed along the streamers (step E4 for "acoustic measurements"). Using these acoustic distance measurements, the acoustic controller deduces a measured real relative geometry of the streamers with respect to one another (step E4: "defining the real relative geometry"). This step is capable of generating a step for detecting a change in real geometry, in which case the acoustic controller performs a new step E2 for generating a new acoustic cycle, selected from among those defined at the step E1 and adapted to the change in real geometry.

A second mode of execution of the method according to the invention is described with reference to FIG. 2.

It may be recalled first of all that an integrated navigation system (INS) is a software system for the acquisition and processing of conventional navigation sensors (such as GPS, magnetic compasses, etc) and sensors specific to the streamers (such as acoustic transducers). This system thus determines the localization of all the apparatuses in water (source, streamers) and also, at each pass, determines the source-receiver localization and finally produces all this data in standard output formats.

Figure 2:
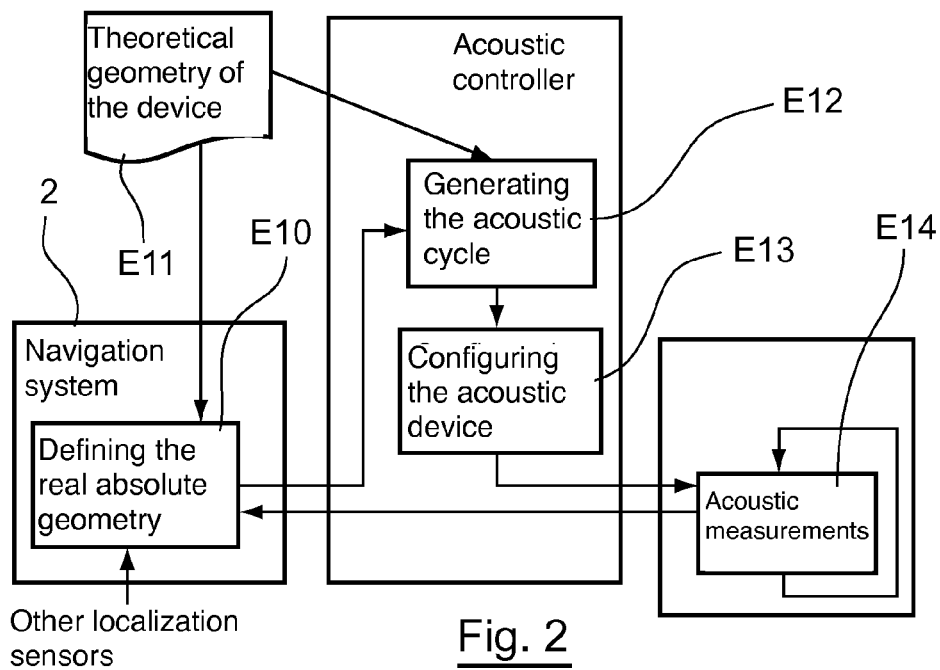
FIG. 2 is a schematic representation of the steps of the method according to a second embodiment of the invention.

According to the embodiment illustrated in FIG. 2, the real geometry of the towed streamers is obtained, firstly, from acoustic measurements (step E14) such as those described here above and, secondly, by means of the navigation system 2 which, uses absolute localization sensors (designated as "other localization sensors" in FIG. 2) such as GPS, current meters, compasses etc from which the navigation system computes the real absolute geometry of the streamers (step E10: "defining the real absolute geometry").

The relative localization data and the absolute localization data of the streamers is transmitted to the acoustic controller which detects a change, if any, in real geometry followed if necessary by a step for generating a new acoustic cycle adapted to the change in real geometry.

Naturally, in this mode of execution, the acoustic controller, in a manner similar to the first mode of execution, performs the following steps:

E11: "theoretical geometry of the device", corresponding to the step E1 in the first mode of execution;

E12: "generation of the acoustic cycle", corresponding to the step E2 of the first mode of execution;

E13: "configuration of the acoustic device", corresponding to the step E3 of the first mode of execution.

According to one characteristic of the method of the invention (in either of the modes of execution that have just been described), the phase for defining different acoustic cycles (step E1 and step E11) includes the parametrizing of acoustic receiving time slots for the acoustic receiving sequences, these time slots being modified if need be so that they are adapted a possible change in real geometry of the streamers.

Besides, in the context of what is called a 4D prospection campaign, the method could also include a step for memorizing positions of the streamers with a view to towing them in memorized paths during a subsequent campaign. In this case, the method then includes a step for positioning the streamers according to the positions memorized during the previous campaign.

What is claimed is:

1. A method for continuous localization of streamers towed by a vessel including at least one onboard acoustic controller, each of said streamers comprising:
    geophysical data sensors;
    acoustic means for measuring distance from at least one adjacent streamer;
    means for the absolute localization of said streamers, wherein the method comprises:
    at least one step for the generation, by said acoustic controller, of an acoustic cycle determining sequences of acoustic sending and receiving between said distance-measuring acoustic means,
    at least one step for defining a series of at least two distinct acoustic cycles, each acoustic cycle being suited to a theoretical geometry representing the shape of said streamers;
    at least one step for determining the real geometry of said streamers;
    at least one step for detecting a change in real geometry followed by a step for generating a new acoustic cycle, selected from among the series of the at least two distinct acoustic cycles defined during said step for defining, said new acoustic cycle being adapted to said change in real geometry.

2. The method according to claim 1, wherein said step for defining includes the parameterizing of acoustic receiving time slots for said acoustic receiving sequences, said step for generating a new acoustic cycle modifying at least the duration of said time slots.

3. The method according to claim 1, wherein said step for determining the real geometry of said streamers is performed by taking account of acoustic measurements given to said acoustic controller by said distance-measuring acoustic means.

4. The method according to claim 1, wherein said step for determining the real geometry of said streamers is performed by taking account of the measurements given to said acoustic controller by said means for the absolute localization of said streamers.

5. The method according to claim 4, wherein said step for determining the real geometry of said streamers is preferably performed by means of localization data given by satellite.

6. The method according to claim 1, wherein said step for defining said acoustic cycles comprises at least one step for configuring cells each defined by a central position corresponding to a central distance-measuring means and by at least one peripheral position corresponding to another distance-measuring means proximate to said central distance-measuring means.

7. The method according to claim 6, wherein said step for defining said acoustic cycles comprises a step for determining reference distances between said central positions and said peripheral positions.

8. The method according to claim 7, wherein said step for defining said acoustic cycles preferably comprising at least one step for controlling said central and peripheral positions relative to said reference distances by means of an operation for putting at least some of said distance-measuring means into communication with one another.

9. The method according to claim 1, comprising at least one step for repositioning at least one of said streamers through the use of navigation control means distributed on the length of said streamers to act at least laterally on the position of said linear streamers.

10. The method according to claim 1, comprising at least one step for memorizing the positions of said streamers and/or positioning said streamers as a function of the memorized positions of said streamers.

* * * * *